June 10, 1947.   D. G. C. LUCK   2,422,107
RADIO DIRECTION FINDER
Filed July 1, 1942   2 Sheets-Sheet 2
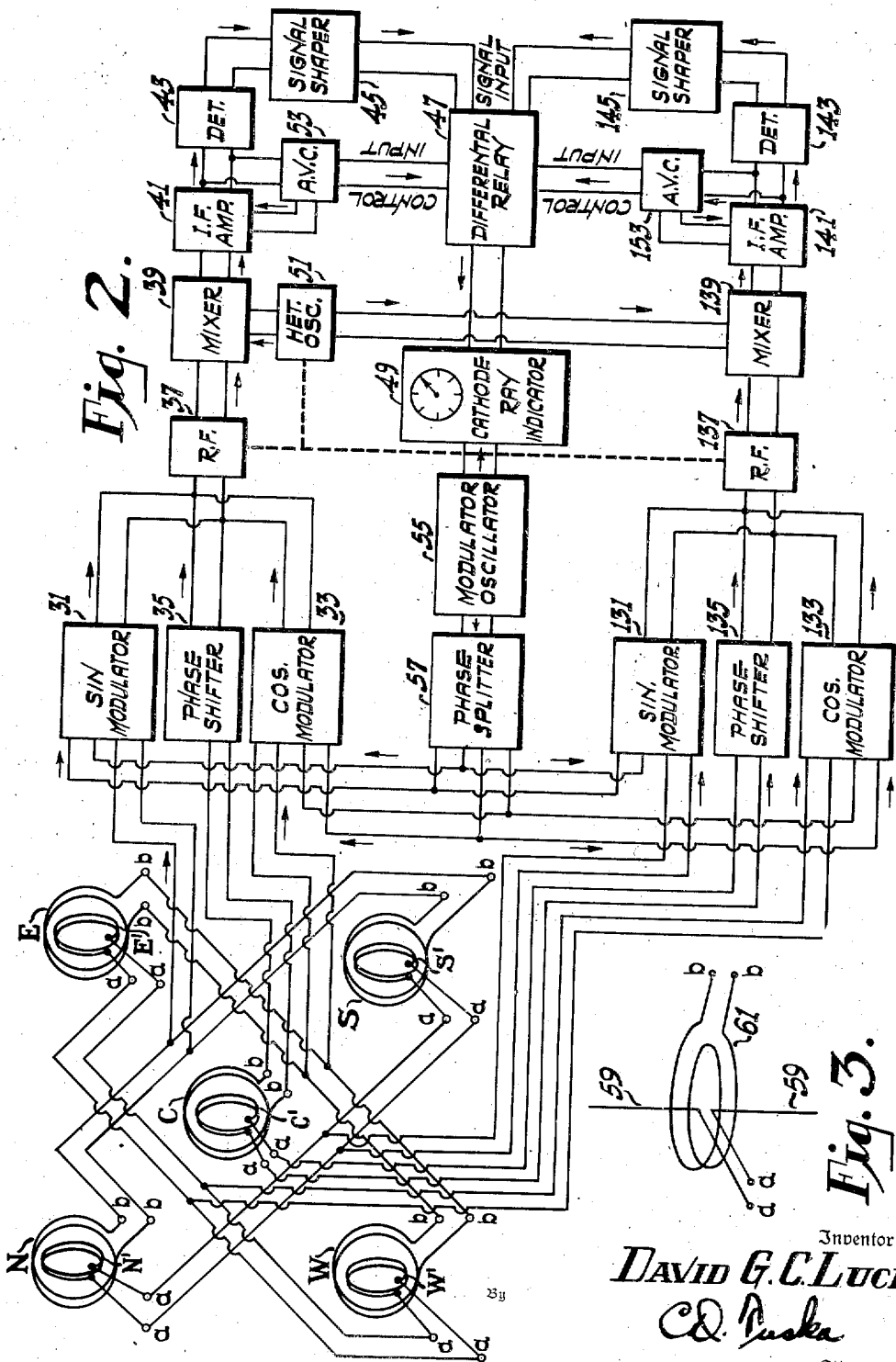
Inventor
DAVID G. C. LUCK
By C. D. Tuska
Attorney Patented June 10, 1947

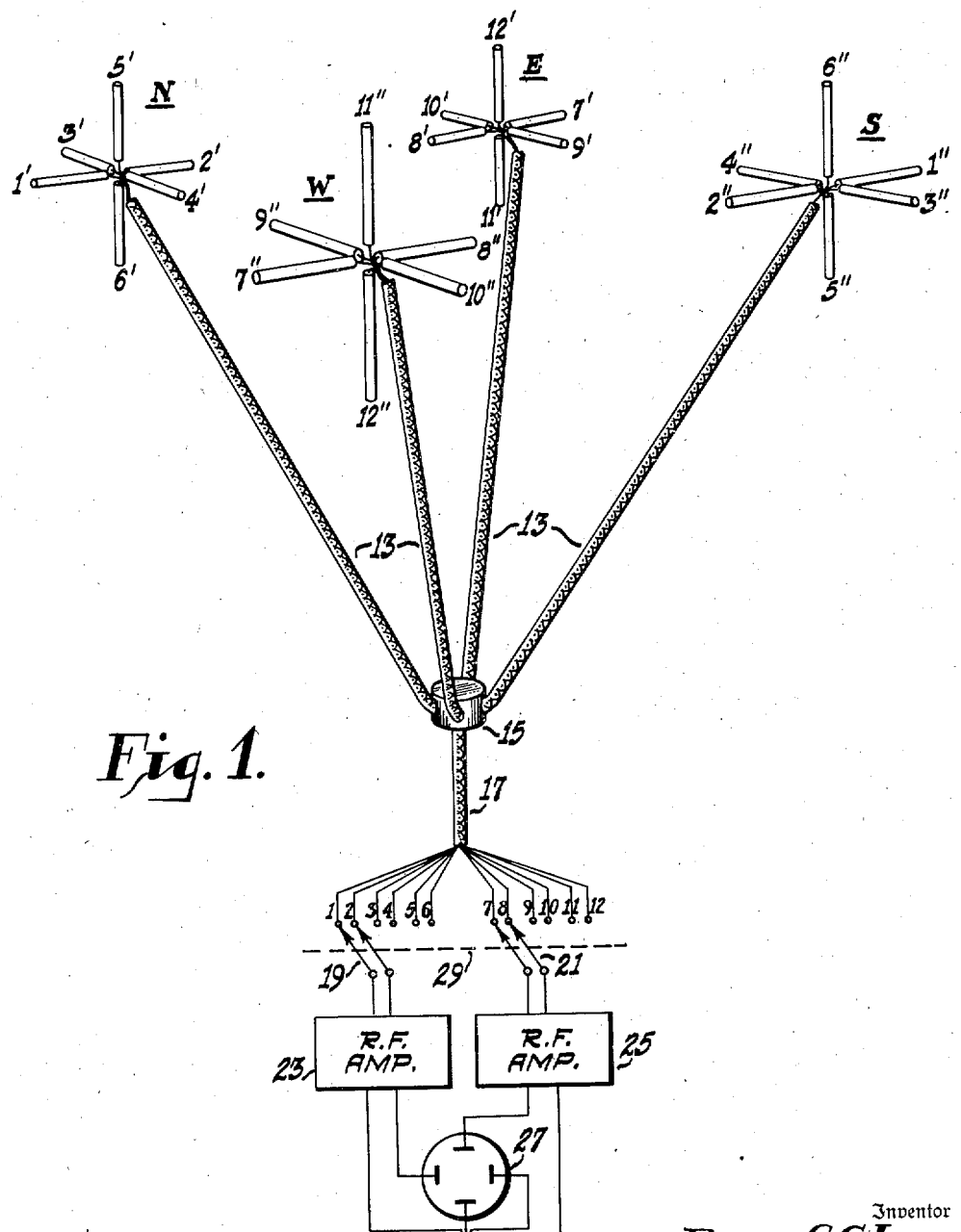

2,422,107

UNITED STATES PATENT OFFICE 2,422,107

RADIO DIRECTION FINDER

David G. C. Luck, Merchantville, N. J., assignor to Radio Corporation of America, a corporation of Delaware Application July 1, 1942, Serial No. 449,229

8 Claims. (Cl. 250—11)

This invention relates to radio direction finders, and more particularly to direct indicating direction finders employing stationary arrays of spaced antennas, with means for combining the outputs of the several antennas to actuate a continuously operating bearing indicator.

Any single antenna, of any type, receiving a single signal wave from any direction, is completely insensitive, or "blind," to some one condition of polarization of that wave. For each direction of wave arrival, the state of polarization for which the antenna is blind is, in general, different. Antennas of different types are ordinarily blind to differently polarized waves arriving from any single given direction. This is equally true of antenna arrays comprising various elements interconnected to combine the several outputs of the component elements in definite phase relation; the "turnstile" antenna of G. H. Brown, for example, is completely blind to vertically downcoming waves circularly polarized either clockwise or counter-clockwise, depending on the phasing circuit used. It is also blind to obliquely arriving waves, elliptically polarized so that the projection of the ellipse in the plane of the turnstile is a circle, if the rotation is opposite to the antenna phasing. Each vertical antenna of the familiar Adcock arrays used in direction finders is blind to vertically downcoming waves of all types, as well as to all horizontally polarized waves.

The existence of blind spots in the directive pattern of each antenna of a direction finder does not prevent the taking of bearings on waves to which the antennas are sensitive. Serious errors in bearing indications may arise due to pickup in the connecting leads or in a shield surrounding them. The resulting currents in the leads or their shields induce voltages in the antennas which are not properly related to give a true bearing indication. When the desired pickup is at a minimum due to blindness of the antennas, the stray pickup, even though slight, may be relatively great in comparison with the desired pickup.

Systems of spaced vertical antennas are particularly susceptible to errors caused by stray pickup on the horizontal interconnections, and coupling thereof to the antennas. Systems of parallel vertical loops, on the other hand, are inherently electrically symmetrical and involve relatively low impedance circuits, and are therefore preferable from the standpoint of stray pickup errors. However, vertical loop systems are generally regarded as unsuitable for fixed antenna direct indicating direction finders because each pair of cross connected loops exhibits a four leafed clover horizontal directivity pattern to vertically polarized waves, with four blind spots. The horizontal directive pattern of a single loop to vertically polarized waves is the figure of eight, or cosine curve. When two spaced parallel loops are connected in opposition, a second cosine pattern is superimposed on the normal loop pattern.

A set of four identical vertical loops with their planes parallel, mounted at the corners of a square with diagonally opposite loops connected in opposition is entirely suited for direct bearing indication. Because the individual loop patterns are similarly placed, their effect drops out in comparing the two antenna pair outputs to determine the direction of signal arrival. The only effect of the loop minima is to prevent the taking of bearings at all on signals arriving from those directions in which the individual loops have no sensitivity.

Accordingly, it is an object of this invention to provide an improved method and means of avoiding harmful blind spots in fixed antenna direction finders.

A further object is the provision of an improved directive diversity system for direction finders.

Another object of the invention is to provide an improved method and means of employing stationary spaced vertical loop antennas in a direction finder.

These and other and incidental objects will become apparent to those skilled in the art upon consideration of the following description, with reference to the accompanying drawings, of which Fig. 1 is a schematic diagram of a direction finder employing spaced groups of dipoles, Fig. 2 is a schematic diagram of a modified system with spaced vertical loops, and Fig. 3 is a schematic diagram of an alternative antenna structure which may be used with the circuits of Fig. 2.

Complete elimination of all blind spots cannot be achieved by any known combination of antenna elements connected for concurrent operation through phasing networks to a single receiver system. In order to provide response to waves of any polarization, arriving from any direction, at least three independent antenna systems are necessary, with separate receivers or some provision for alternative connection to a single receiver whereby the output circuit of each antenna system is electrically isolated from that of the others. The present invention is not concerned with the well known space diversity systems of reception, used to combat fading caused by interference between distant signal rays arriving along different paths, but employs a directivity diversity system for insuring effective reception of any single ray by eliminating fading caused by variation in the polarization of that ray.

Referring to Fig. 1, four antenna groups, N, E, S and W are arranged at the corners of a square as in the usual Adcock systems. Each group comprises three dipoles intersecting in a common midpoint at right angles to each other; the corresponding dipoles of the four groups lie in parallel lines. Leads from the antennas are brought down through cables 13 or in any other suitable manner, to a junction box 15 where they are interconnected. Each component of the group N is connected to the correspondingly numbered oppositely directed component of the group S. The diagonally opposite groups E and W are similarly cross connected. Thus the element 1' is connected to the element 1'', and so on. Connections from the junction points are made through a cable 17 to a pair of double-pole triple-throw switch devices 19 and 21. The switch contacts 1—12 are connected to the correspondingly numbered antenna elements; contact 1, for example, goes to the elements 1' and 1''. The movable contacts of the switches 19 and 21 are connected to the inputs of radio devices 23 and 25 respectively, which for the sake of simplicity of description, are designated as radio frequency amplifiers. The output circuits of the devices 23 and 25 are connected to the horizontal and vertical deflecting circuits respectively of a cathode ray oscilloscope 27. The switches 19 and 21 are mechanically ganged, as schematically indicated by the dashed line 29, and may be operated either manually or by a suitable motor, not shown.

The adjustment and operation of the system of Fig. 1 is as follows: The devices 23 and 25 are tuned to the frequency at which operation is desired. The device 23 is sequentially connected to the three pairs of corresponding dipoles constituting the antennas N and S, while the device 25 is simultaneously connected in corresponding sequence to the antennas E and W. When the switches are in the position shown in the drawing, the device 23 amplifies the signal, if any, picked up by the antennas 1'—2' and 1''—2'', and applies it to one deflecting circuit of the oscilloscope 27. The signal picked up by the antennas 7'—8' and 7''—8'' is similarly applied to the other deflecting circuit. The resultant trace of the cathode ray beam on the screen of the oscilloscope is directed at an angle, with respect to a reference line, corresponding to the azimuth of arrival of the waves from which the signals are derived.

As the switches 19 and 21 are operated to successive positions, the length of the trace on the oscilloscope screen will vary in accordance with the sensitivities of the different antenna systems to the particular waves being received. If one or more of the antenna systems are completely blind there is no signal and hence no trace when the switches are in the corresponding positions. If more than one trace appears, the operator takes the longest one as the most likely to be a true bearing indication, since it is derived from the system having the greatest sensitivity and is therefore least subject to stray pickup errors.

As stated above, spaced vertical loops are generally regarded as unsuited for stationary antenna direction finders because of the horizontal directivity of each loop. The application of directivity diversity to the solution of this difficulty is exemplified by the embodiment of this invention illustrated in Fig. 2.

Four vertical loops, N, E, S and W are positioned in parallel planes at the corners of a square, with diagonally opposite loops connected in phase opposition to give two separate antenna pairs. The N—S pair is connected to a balanced modulator, 31, and the E—W pair is connected to a balanced modulator 33. A fifth loop C is disposed at the center of the antenna square and connected to a phase shifter 35. The combined outputs of the devices 31, 33 and 35 go through an R. F. amplifier 37, a mixer 39, an I. F. amplifier 41, a detector 43, a signal shaper 45, and a differential relay 47 to a cathode ray phase indicator 49. The amplifiers 37 and 41, mixer 39, and detector 43, together with a heterodyne oscillator 51 and an automatic volume control circuit 53 constitute a radio receiver and operate together as in an ordinary superheterodyne. A modulator oscillator 55 is connected through a phase splitter 57 to control the modulators 31 and 33 in quadrature.

The system thus far described is substantially identical, except for the antennas, with that described in U. S. Patent No. 2,208,378, entitled Continuously indicating radio compass, application Serial No. 216,825, filed on June 30, 1938, by D. G. C. Luck. The operation is different only insofar as it is affected by the characteristics of the vertical loop antennas, as described above.

A second system of parallel loops N', E', S', W' and C' is provided, with each loop positioned concentrically and at the same angle to the corresponding loops of the other system. These loops are connected through modulators 131 and 133, phase shifter 135, amplifiers 137 and 141, mixer 139, detector 143, and signal shaper 145, comprising a duplicate of the system associated with the first group of loops, to a second input circuit of the differential relay 47. The modulator oscillator 55, phase splitter 57, and heterodyne oscillator 51 are common to both systems. The tuning controls of the R. F. amplifiers 37 and 137 are mechanically ganged together with the oscillator 51 as indicated by the dashed lines between these components. The opposing actuating elements of the differential relay 47 are connected to the automatic volume control circuits 53 and 153 of the respective receiver systems.

The operation of the complete system is as follows: Each of the two component systems produces at its input to the relay 47 an alternating voltage of the frequency of the oscillator 55, and related in phase to the oscillator voltage in accordance with the azimuth of arrival of the waves to which the receivers are tuned. The automatic volume control circuits 53 and 153 operate in well known manner to produce voltages related in magnitude to the respective responses of the two systems. These voltages oppose each other in the relay 47 and accordingly actuate said relay to connect the more effective of the two systems to the bearing indicator 49. Thus the indication is always derived from the loop system which is better situated to provide accurate results.

Although the system of Fig. 2 comprises only two channels, it will respond, through one or both channels, to any wave whatever except those which are horizontally incident and horizontally polarized. Since such waves cannot travel any substantial distance over the earth's surface, the crossed vertical loops do not miss any important type of arriving wave. Each component system has the fredom from errors resulting from the inherent symmetry and the low impedance of loop antennas. To take full advantage of these characteristics, the lead-ins from the antennas should be brought down in such a manner as to avoid magnetic coupling to the loops. This may be done, for example, by bringing the leads straight down for an appreciable distance before taking them horizontally to the other apparatus.

An alternative pair of antennas is shown in Fig. 3; the terminals $a$, $a$ and $b$, $b$ of such a pair may be connected to each correspondingly lettered pair of terminals in Fig. 2 instead of the vertical loops shown there.

A vertical antenna, such as a dipole 59 is positioned coaxially with respect to a horizontal loop 61, which is equivalent to a vertical magnetic dipole. The vertical antenna 59 is responsive to any wave having a vertical electric field component and insensitive to any wave having a purely horizontal electric field. The horizontal loop 61 is sensitive to any wave having a vertical magnetic field component and insensitive to any wave having a purely horizontal magnetic field. Between them, the vertical rod and horizontal loop are sensitive to all waves except those traveling vertically downward and hence having purely horizontal fields of both sorts. Since vertically approaching waves have no definite azimuth, this is not a diasadvantage in a direction finder. The systems of Figs. 2 and 3 are preferable to other two collector combinations for direction finding.

Thus the invention has been described as a direct indicating direction finder with a plurality of differently directive antenna systems, arranged to respond, between them, to all types of arriving waves. Each antenna system is made electrically independent of the other, and means are described for connecting selectively or successively a single bearing indicator to one system at a time, so that bearings may always be taken with the antennas best adapted to receive any particular wave.

I claim as my invention:

1. A radio direction finder comprising a plurality of independent arrays of spaced antennas having different directivity patterns, separate channels associated with each array comprising means for deriving voltages related to each other in accordance with the differences in phase of the signals derived at the different antennas of an array from an incident wave; a bearing indicator, and means responsive to the outputs of said arrays for connecting said bearing indicator to be actuated through one of said channels.

2. A radio direction finder comprising a plurality of independent antenna arrays, the antennas of each array being similar to each other and different from the antennas of each of the other arrays, whereby a response to any arriving wave will be produced in at least one of said arrays; separate means associated with each array for deriving from the output of said array voltages related to each other in accordance with the azimuth of arrival of the wave from which said output is derived; a bearing indicator and means responsive to the amplitudes of the outputs of all of said arrays to apply the output of one of said arrays to said indicator.

3. A direction finder comprising a plurality of independent antenna arrays, each array comprising antennas having identical directivities different from those of the antenna of each of the other arrays, whereby a response to any type of arriving wave will be produced in at least one of said arrays; a bearing indicator, and means responsive to the outputs of all of said arrays for selectively connecting said bearing indicator to any one of said arrays.

4. A direction finder comprising a plurality of spaced groups of antennas, each group comprising three dipoles arranged at right angles to each other; each set of the corresponding dipoles of all of said groups lying in parallel lines and acting as a directive array; a bearing indicator, and means for selectively connecting said bearing indicator to any one of said arrays of dipoles.

5. A radio direction finder comprising a plurality of spaced groups of loop antennas, each group comprising two vertical loops positioned at an angle to one another, the corresponding loops of all of said groups lying in parallel planes and acting as a directive array; a bearing indicator, and means responsive to the outputs of both of said arrays for selectively connecting said indicator to either one of said arrays of loops.

6. A direction finder comprising a plurality of spaced groups of antennas, each group comprising a vertical rod-like antenna and a horizontal loop disposed coaxially with respect to said rod; a bearing indicator, and means for selectively connecting said bearing indicator to respond to the outputs of similar antennas in all of said groups.

7. A radio direction finder comprising a plurality of independent arrays of spaced antennas having different directivity patterns with respect to a common reference, separate channels, one connected to each array for deriving voltages related to each other in amplitude in accordance with the differences in phase of the signals produced by orthogonal pairs of antennas of each array in response to an arriving wave, each of said channels comprising sine and cosine modulators with their input circuits connected to the pairs of antennas comprising the respective array and with their output circuits coupled to a demodulator, a common oscillator coupled directly to said cosine modulators and through a 90° phase shifter to said sine modulators, relay means differentially responsive to the outputs of said channels, and bearing indicator means connected to said oscillator and through said relay means selectively to said channels.

8. A radio direction finder comprising a plurality of spaced groups of loop antennas, each group comprising two vertical loops positioned at an angle to each other, the corresponding loops of all of said groups lying in parallel planes and acting as a directive array, separate channels, one connected to each array for deriving pairs of voltages related to each other in amplitude in accordance with the differences in phase of the signals derived by orthogonal pairs of antennas of each array from an arriving wave, bearing indicator means adapted to respond to one of said pairs of voltages to provide an indication of the azimuth of said arriving wave, and differential relay means responsive to the amplitudes of the signal voltages derived from all of said arrays to apply one of said pairs of voltages to said bearing indicator.

DAVID G. C. LUCK.

REFERENCES CITED

The following references are of record in the file of this patent:

FOREIGN PATENTS

| Number | Country | Date |
|---|---|---|
| 507,461 | Great Britain | June 15, 1939 |